Patented Mar. 22, 1949

2,465,237

UNITED STATES PATENT OFFICE 2,465,237

TREATMENT OF OIL WELLS

Delmar H. Larsen, Los Angeles, Calif.

No Drawing. Application March 31, 1937,
Serial No. 134,088

7 Claims. (Cl. 252—8.55)

This invention relates to the treatment of oil wells, and more particularly a method for increasing the permeability of the sands adjacent to oil wells, by effecting removal of water from said sands.

It has for some time been recognized that oil sands (and in the term "oil sands" I mean to include all those subterranean formations capable of containing, or containing petroleum) often, and indeed apparently quite frequently contain a proportion of water, even though such sands produce oil which is comparatively free of water. This water is either so-called "connate water," that is, it was laid down with the oil, or filled the sand originally and was later displaced by the oil; or it may consist in part of water which has been introduced during or as a result of the drilling operations, as for instance seepage (into the formation) of water from the mud fluid used in drilling the well, or again water used in swabbing the sides of the bore. The proportion of pore space filled by connate water has been estimated by various observers as a result of their experiments to range usually from ten to fifty per cent by volume of total pore space.

Now it is possible for oil fairly well uncontaminated by water to flow from an oil sand thus partially filled with water because of the fact that most oil sands are selectively wet by water as against oil (whereby mineral or petroleum oil or oils is meant). The angle of contact of water against oil on most of the common reservoir rocks, such as are composed of silica, feldspar, alumina, barytes, and similar minerals is acute, just as is the angle of cantact of water against air on glass. For this reason water tends to displace oil from capillary pores in such reservoir rocks (that is to say, subterranean petroleum reservoir rocks). It may be mentioned that Bartell and co-workers (Journal of Physical Chemistry, 1930, 1932, 1933, and 1934) have demonstrated that the capillary behavior of oils and water on glass is quantitatively similar to their capillary behavior on silica, feldspar, and other common oil sand minerals.

It is necessary at this point to introduce and define a term, "capillary tension" in order to make easier the elucidation of the invention. The radius of curvature of the interface between two liquids in a round tube is equal to the radius of curvature of the tube if the contact angle is zero; and measurement of interfacial tension may be made from such capillary rise measurements directly. But if the angle of contact is not zero, it is a matter of geometry to demonstrate that the radius of curvature of the interface equals the radius of the capillary bore divided by the cosine of the angle of contact. Now it is the curvature of the interface as well as the interfacial tension which determines the pressure difference across the interface; a liquid will not rise as high in a tube for which the angle of contact is greater than zero than in a tube made of some material for which the angle of contact is equal to zero, other conditions being equal. The ratio of the two heights moreover is equal to the ratio of the cosines of the two angles of contact. Capillary tension is here defined as the interfacial tension between two phases multiplied by the cosine of the angle of contact; and the following formula may be derived for pressure difference across the interface obtaining in a capillary tube of circular bore (the tube being assumed small enough that any effect of gravity in distorting the shape of the interface from that of a segment of a sphere may be neglected):

$$p = I \cos \theta + 2r = C + 2r$$

where $p$ is the pressure difference in dynes per square centimeter, $I$ the interfacial tension in dynes per centimeter, where $\theta$ is the Greek letter theta: $\theta$ the angle of contact, $r$ the radius of the capillary in centimeters, and $C$ the capillary tension in dynes per centimeter. It is now clear that the reason for introducing the term "capillary tension" is that it is this quantity which is directly measured in capillary tube determinations; interfacial tensions may be derived therefrom only when the angle of contact is known.

As has been mentioned, oil and water commonly coexist in subterranean reservoirs; since the rocks thereof are selectively wet by water, that is, since the angle of contact of the water is acute, the innumerable interfaces between water and oil in such a reservoir are concave towards the oil; the water occupies the smaller crevices such as are formed at and close to the points of contact of the sand grains, and the oil occupies the pores between the grains, being bounded by these grains and by the concave water-oil interfaces. As oil is withdrawn from the reservoir, pressure gradients set up by the flow are usually insufficient to effect a removal of water at all complete, the insufficiency being greater with higher capillary tensions. Now the permeability of the formation to the flow of oil (and in this disclosure "permeability" has its usual significance, that is, the ability of a porous formation to permit flow of fluid under a pressure gradient) depends on the effective average pore radius; this is reduced to a greater or less extent by the water present as described, and which water under the usual methods of oil production is incompletely, indeed often scarcely at all removed. It is evident that if the water in an oil-bearing formation can be removed, the permeability of the said formation to oil will be beneficially increased, thus facilitating the production of petroleum from the well.

It is evident from the above discussion that if the character of the reservoir rock surface be changed so that the angle of contact of the water against the oil is no longer acute, that is, so that the oil sands are preferentially wet by oil, the water will be dislodged from the crevices which it formerly occupied. I am aware that this procedure is claimed in United States Patent No. 2,024,119, and I wish to make clear that my invention comprises no such alteration in the character of the rock surfaces. My invention relates to the reducing of the interfacial tension between the water and the oil, in order that the water may be removed to a substantial extent, thus enlarging the effective size of the pores through which the oil must travel in order to reach the well.

The process of my invention is carried out by introducing into the well bore and outwardly into the oil and water bearing sands adjacent a well bore a liquid of such a character and having such properties that it reduces the capillary interfacial tension of the oil-water interface, without bringing about any permanent change in the hydrophilic character of the reservoir rock. In accordance with an illustrative embodiment of this invention there is introduced into the well bore and forced outwardly into the formation, a compound which may be defined as a heteropolar compound of a character capable of adsorption by the oil-water interface and to substantially reduce the capillary interfacial tension between the oil and the inhibiting water, in order to release the oil and permit the oil so released to flow back into the well. As an embodiment of this invention, the compound may be one capable of accelerating the emulsification of the oil and water; in fact the compound may be a water-oil emulsifying compound. The compound employed may be one which is chemically neutral towards the formation.

The reduction in the capillary interfacial tension may be partial, in which case the water is removed (to a greater or less extent) by pressure gradients set up by the flow when the well pressure is reduced subsequent to the introduction of the fluid, allowing flow into the well; or it may be complete, that is, oil, water, and introduced liquid may form a single phase, in which case water and all is flushed into the well when flow is allowed. In actual practice, using liquids of the general character first described hereinafter, the process will usually be effected by both these mechanisms, for close to the well where the concentration of the introduced liquid is great, the reduction of interfacial tension will be complete, whereas farther away from the well the necessarily smaller amount of introduced liquid will bring about a partial reduction in capillary tension. Finally, to complete the process, the pressure is released and the well allowed to flow, as has been indicated. The process may be repeated as many times as thought necessary or justified from an economic standpoint, in order to obtain a satisfactory increase in permeability. The technique of introducing liquids into wells under pressure is well known to those skilled in the art of petroleum production.

There is a class of solvents which dissolve appreciable quantities of both water and hydrocarbons. While such solvents when added in sufficient quantity are able to reduce the interfacial tension between petroleum oils and water to zero, that is, to form a single phase of a mixture of oil, water, and solvent; the amount of such solvents required to effect that result is rather large compared with the amount of compounds required in accordance with this invention. To illustrate, I give below the names of some of the most readily obtainable solvents, together with the amount in cubic centimeters of solvent or a mixture of several necessary to reduce a mixture of one-half cubic centimeter of water and one-half cubic centimeter of hydrocarbon to a single phase, i. e., to reduce the interfacial tension to zero.

| | Solvent | Ccm. solvent necessary to reduce to zero the interfacial tension between a hydrocarbon and water, one-half ccm. of each of the latter being used, and the temperature being 73° F. | |
|---|---|---|---|
| | | Ccm. for a refined Russian mineral oil, d. 00.8655 | Ccm. for "Peerless" gasoline, density, 0.740 |
| 1 | Acetone | 24.0 | |
| 2 | Isopropyl alcohol | 9.8 | 3.6 |
| 3 | n-Butyl alcohol | 4.9 | 6.9 |
| 4 | Isoamyl alcohol | 7.2 | 17.4 |
| 5 | 1,4-Dioxane | 9.0 | 6.6 |
| 6 | Ethylene glycol monoethyl ether | 23.2 | |
| 7 | 20% (by vol.) of 2, 50% of 3, 30% of 4 | 5.0 | |
| 8 | 50% (by vol.) of 2, 50% of 4 | 5.7 | |

It will be observed from the above that there is considerable variation in the capillary tension reducing powers of these solvents towards different hydrocarbons. It is thus not possible to state which is the best for all conditions; which solvent, or a mixture of which is most suitable must in general be determined by field tests, wherein the different solvents thought to be suitable are added to known quantities of petroleum from the well and water, and the power of the different solvents to bring about a single phase compared.

Moreover, the practice of the invention must not be regarded as confined to the use of pure liquids. Mixtures of solvents, such as indicated in solutions 7 and 8 of the above table are obviously able to carry out the process with which this invention is concerned. Again, the components of a suitable mixture do not have to be all selected from the class of liquid solvents.

In accordance with this invention the interfacial tension between crude oil and water is reduced by introducing into the oil sands a substance of the type which is adsorbed at the oil-water interface. These substances are generally of the type known to physical chemists as heteropolar, that is, one end of the molecule is polar, the other end is non-polar. At an oil-water interface such a molecule becomes oriented with its polar end in the aqueous phase and its non-polar end in the oily phase, thus reducing the interfacial tension, and accordingly the capillary tension as hereinbefore defined. A typical example of such a molecule is n-hexyl resorcinol. Another example is any soap, that is, a metal salt of a fatty acid. Again, the fatty acids themselves are heteropolar, and are suitable interfacial tension reducing substances.

Comparatively small quantities of reagents of the heteropolar type are sufficient, since their action depends on interfacial adsorption, and not, as in the case of solvents, on making the whole of the aqueous phase more like the whole of the oily phase in physico-chemical nature. Accordingly, a suitable procedure is to introduce the heteropolar reagent in a liquid carrier to obtain dispersion throughout a large portion of the oil sands surrounding a well. The carrier could be water for most heteropolar reagents in low concentrations, but I prefer to use a carrier of either petroleum or light hydrocarbons, or one of the solvents or solvent mixtures hereinbefore mentioned and suggested. I prefer this in order not to increase the total bulk of the aqueous phase to a needless extent.

As an example of the reduction in interfacial tension by this means are quoted some results obtained by Mead and McCoy (Colloid Symposium Monograph, IV 44 (1926):

| System | Heteropolar Compound | Concentration in Oily Phase | Interfacial Tension in dynes per cm. |
|---|---|---|---|
|  |  | Per Cent |  |
| Kerosene, Water | Oleic acid | 0 | 42 |
| Do | do | 0.65 | 21 |
| Do | Stearic acid | 0 | 42 |
| Do | do | 1.3 | 22 |
| "Nujol," Water | Oleic acid | 0 | 52½ |
| Do | do | 1.4 | 14 |
| Do | Stearic acid | 0 | 52½ |
| Do | do | 0.5 | 34 |
| Do | Sodium oleate | 0 | 52½ |
| Do | do | 0.8 | 29 |
| Kerosene, Water | Amylene | 0 | 42 |
| Do | do | 6 | 35½ |

"Nujol" is a refined paraffin oil, water-white, used medicinally. In the last example, amylene is somewhat heteropolar because of a double bond at one end of the molecule.

As an example of the reduction in capillary tension of a petroleum oil and water by a solvent of the class hereinbefore set forth when in such a concentration as not to reduce the system to one phase, I give some experimental data on the system Water, "Peerless" gasoline (a motor fuel marketed in California), and 1,4-dioxane. Capillary tensions refer to the system as against Pyrex glass but the behavior against common reservoir rocks may be expected to be similar, as hereinbefore mentioned. Moreover, it was evident that the reduction in capillary tension was brought about largely if not wholly by a reduction in interfacial tension, for visual examination disclosed the interfacial contact angle to be acute and of about the same magnitude both before and after introduction of the 1,4-dioxane.

*Partial reduction of capillary tension between "Peerless" gasoline and water caused by addition of 1,4-dioxane. Temperature, 73° F.*

System I: "Peerless" gasoline and water.
System II:
    14.0% by weight gasoline
    18.5% by weight water
    67.5% by weight 1,4-dioxane which yields a two-phase system which is 37.8% by weight oily phase, density 0.900
    62.2% by weight aqueous phase.

Surface tension gasoline: 19.7 dynes per cm.
Capillary tension, system I: 41.4 dynes per cm.
Capillary tension, system II: 0.7 dyne per cm.

The reduction of capillary tension to an exceedingly low value before the point of composition to a single phase is quite evident.

It may be noted that oil-water emulsions are formed by the reduction in interfacial tension caused by adsorption of such a heteropolar compound as hereinbefore mentioned. The conditions for stability of an emulsion are not completely known to colloid chemists; there always is an element of the unpredictable in the formation of emulsions. It is to be expected, then, that when the process of this invention is carried out, sometimes an emulsion will result, and sometimes the water and oil will issue together, but not noticeably emulsified. It is not possible to lay down rules here for predicting which will result; nor is it necessary for a complete disclosure of the invention; for the assisting of the removal of the water from the sand surrounding an oil well by the injection of the compounds embodying this invention is the object of this invention, and the form in which the water issues is incidental. Nevertheless I make the remarks in this paragraph because many substances have been developed, some patented, which are in the nature of oil-water emulsifying agents, and as such are familiar to chemists. I mention here for example sulfonates of fatty acids, soaps, diglycol stearate, diglycol laurate. Many others will occur to chemists familiar with problems of emulsification. These would most conveniently of course be introduced into the oil sands in solution in a suitable carrier, such as for example gasoline or kerosene.

I also wish to point out the difference between the practice of this invention and the condition of many wells whereby they habitually produce a mixture of water and oil in the form of a natural emulsion. This last is usually looked upon as an unfortunate condition. The introduction of chemicals into holes surrounding the bore hole and from which oil is to be produced is also to be distinguished from, because in such a process large quantities of a chemical are required, as distinguished from a process in which the compound embodying this invention is introduced into the well bore and forced outwardly into the formation.

One specific embodiment of the invention is the following: A 2% solution of stearic acid in kerosene is forced into the productive formation surrounding the liner of an oil well. The pressure is then released and the well allowed to flow, a partial vacuum being applied if considered necessary because of low rock pressure. A mixture of water, oil, and amyl alcohols issues forth into the well, thus increasing the permeability of the treated sands toward oil by the removal of water.

It is to be understood that while a number of embodiments have been described, this invention is susceptible of various embodiments within the scope of the appended claims.

I claim:

1. In a method of treating a petroleum oil-bearing stratum penetrated by a well bore, the steps carried out consecutively which consist first in introducing alone and under pressure into the well bore and thence into the oil bearing stratum a dispersible water-oil emulsifying compound and second putting the well into production.

2. The method of treating a formation containing oil and water surrounding an oil well bore and in which the water inhibits flow of the oil into the well bore, comprising, introducing into the well bore and forcing outwardly into said formation, an agent which is of a character capable of causing emulsification of oil and of the inhibiting water from the formation in order to release the oil and permitting the oil so released to flow back into the well.

3. The method of treating a formation containing oil and water surrounding an oil well bore and in which the water inhibits flow of the oil into the well bore, comprising, introducing into the well bore and forcing outwardly into said formation, an agent which is chemically neutral toward the formation and of a character capable of causing emulsification of oil and of the inhibiting water from the formation in order to release the oil and permitting the oil so released to flow back into the well.

4. The method of treating a formation containing oil and water surrounding an oil well bore and in which the water inhibits flow of the oil into the well bore, comprising, introducing into the well bore and forcing outwardly into said formation, a carrier and an agent which is dispersible in oil and of a character capable of causing emulsification of oil and of the inhibiting water from the formation in order to release the oil and permitting the oil so released to flow back into the well.

5. In a method of treating a petroleum oil bearing stratum penetrated by a well bore, the steps carried out consecutively which consist first in introducing, under pressure, into the well bore and then into the oil bearing stratum, a petroleum oil carrying an agent dispersible in the petroleum oil and capable of accelerating the emulsification of oil and water and, second, putting the well into production.

6. The method of treating a formation containing oil and water surrounding an oil well bore and in which the water inhibits flow of the oil into the well bore, comprising, introducing into the well bore and forcing outwardly into said formation, a heteropolar compound of a character capable of adsorption by the oil-water interface and to substantially reduce the capillary interfacial tension between the oil and the inhibiting water in order to release the oil and permitting the oil so released to flow back into the well.

7. The method of treating a sand formation containing oil and water surrounding an oil well bore and in which the water inhibits flow of the oil into the well bore, comprising, introducing into the well bore and forcing outwardly into said sand formation, a heteropolar compound of a character capable of adsorption by the oil-water interface and to substantially reduce the capillary interfacial tension between the oil and the inhibiting water in order to release the oil from the sand and permitting the oil so released to flow back into the well.

DELMAR H. LARSEN.

REFERENCES CITED

The following references are of record in the file of this patent:

UNITED STATES PATENTS

| Number | Name | Date |
| --- | --- | --- |
| 1,822,271 | Coggleshall | Sept. 8, 1931 |
| 1,823,440 | De Groote | Sept. 15, 1931 |
| 1,894,759 | De Groote | Jan. 17, 1933 |
| 2,024,119 | Vietti et al. | Dec. 10, 1935 |
| 2,024,718 | Chamberlain | Dec. 17, 1935 |
| 2,028,091 | Jaeger | Jan. 14, 1936 |
| 2,050,933 | De Groote | Aug. 11, 1936 |
| 2,262,428 | Lietz | Nov. 11, 1941 |
| 2,267,548 | Berl | Dec. 23, 1941 |

OTHER REFERENCES

Neville et al., Wetting Agents in Textile Processing, Article in The American Dyestuff Reporter, vol. XXII, No. 19, Sept. 11, 1933, 3 pages.